Patented Jan. 22, 1929.

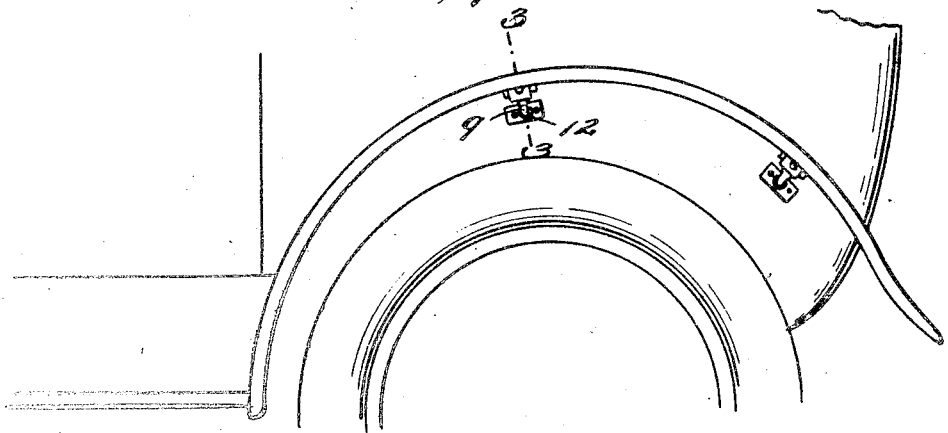
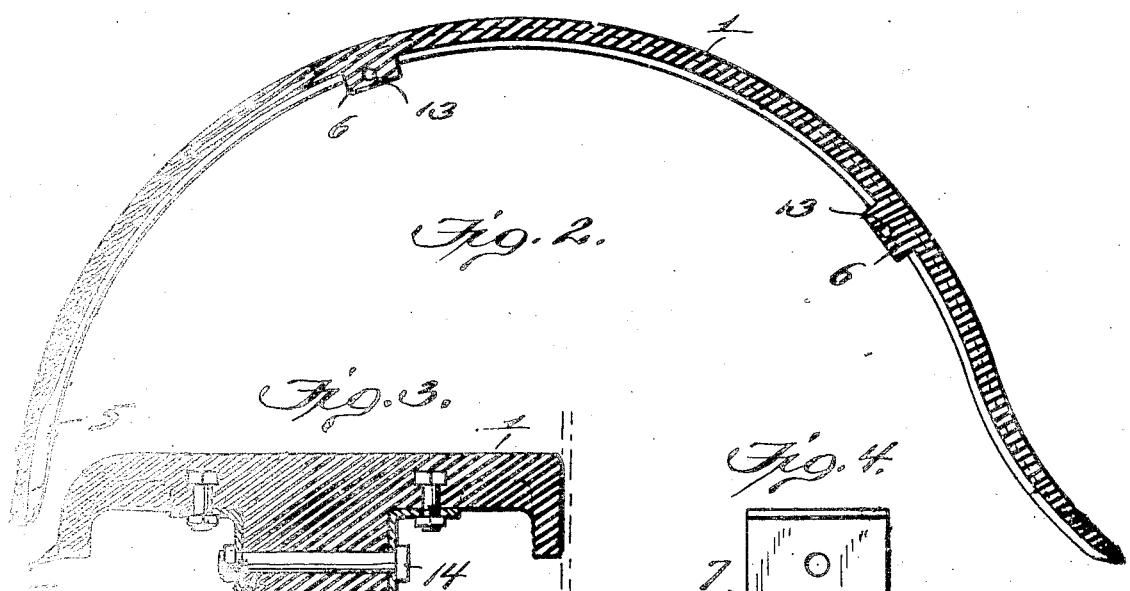
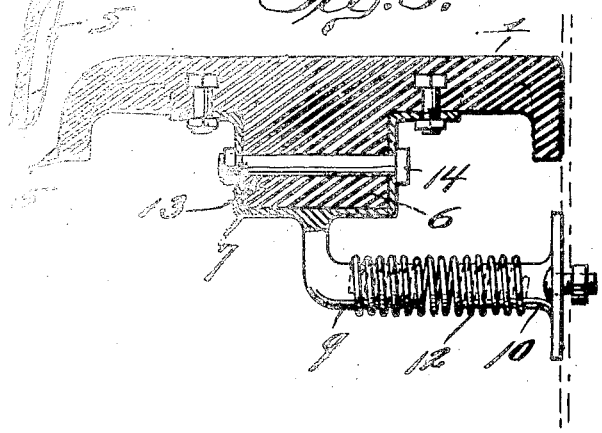
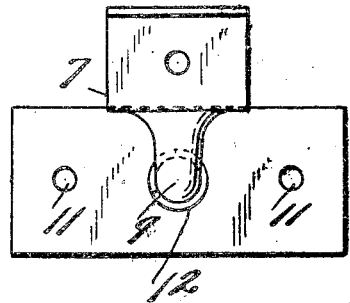

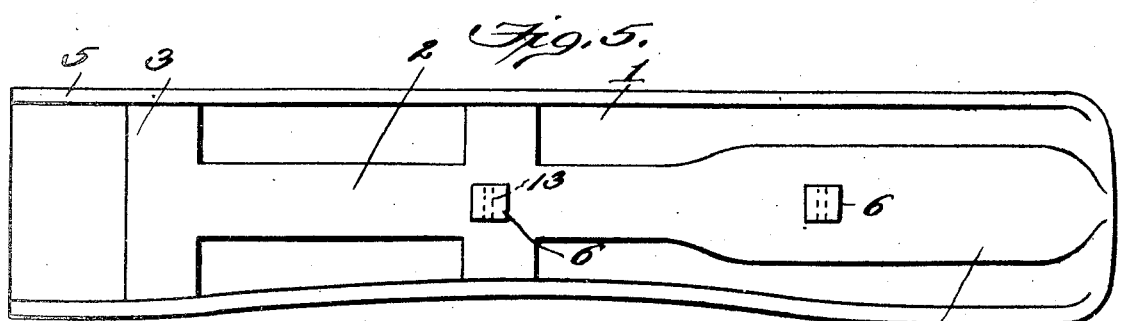
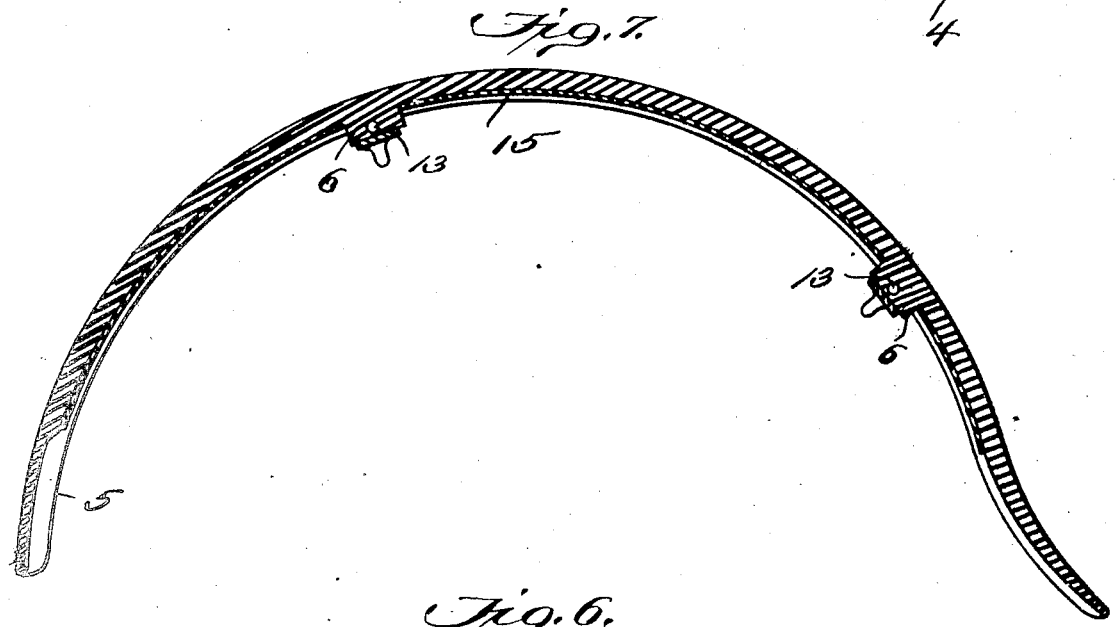
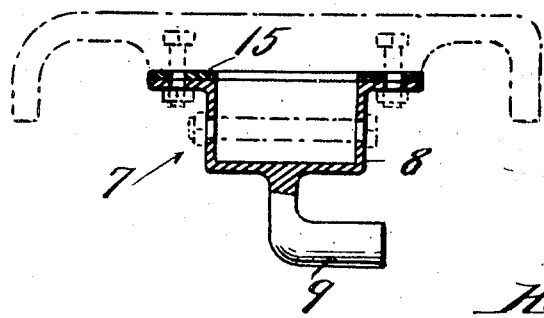

UNITED STATES PATENT OFFICE.

HENRY J. SCHEID, OF SOUTH BEND, INDIANA, ASSIGNOR TO JAMES R. BEYRER, FERRON R. DAVIS, JOHN W. BAIRD, GEORGE M. STEPHENSON, AND HENRY J. SCHEID, TRUSTEES, ALL OF SOUTH BEND, INDIANA.

NONMETALLIC RESILIENT FENDER FOR AUTO VEHICLES.

Application filed December 19, 1925. Serial No. 76,535.

This invention relates to fenders or mud guards for auto vehicles and proposes the construction of an improved fender of nonmetallic and resilient material such as rubber, or preferably the composition of rubber and fabric obtained by reclaiming discarded vehicle tires.

One of the objects of the invention is to provide a fender of such inherent elasticity as to yield to the impact of collision without breaking or being permanently bent, returning to its original shape when relieved from the pressure of the colliding object.

Another object of the is the provision of a resilient non-breakable fender, as incapable of doing damage to an object with which it is in collision as it is of being damaged itself.

Still another object of the invention is the provision of a non-resilient fender that will not augment the sound vibrations of the chassis, nor transmit them to the space within the car body, particularly in enclosed vehicles.

A further object of the invention is to provide a resilient mounting for the fender securing the fender to the body of the automobile so that the flexibility and deformability of the fender will not be impeded.

Other objects of the invention will appear as the following description of a preferred embodiment thereof proceeds.

In the drawings:—

Figure 1 is a side elevation of the rear portion of an auto vehicle showing one of my improved non-metallic resilient fenders in place.

Figure 2 is a longitudinal section through the fender.

Figure 3 is a cross section taken along the line 3—3 of Figure 1.

Figure 4 is a front elevation of the bracket by means of which the fender is secured to the auto vehicle.

Figure 5 is an underneath plan view of the fender lying flat.

Figure 6 is a modified form of bracket in which a longitudinal fender-supporting strip constitutes a distinguishing feature.

Figure 7 is a longitudinal section through a fender supported by brackets of the type shown in Figure 6.

Referring now in detail to the several figures, the fender consists of a crown portion 1 stiffened by a longitudinal rib 2 and cross-ribs 3. The free end of the fender is preferably reinforced and strengthened by a reinforcing portion 4 formed by increasing the width of the longitudinal rib. The fender may or may not be formed with flanges 5 although these are preferably provided, for the purpose of further strengthening the fender and enabling it to hold its shape under normal circumstances. Bosses 6 are provided, the especial function of which is to afford means for the engagement of the brackets by which the fender is secured to the auto vehicle. The fender is made non-metallic throughout and preferably consists of an elastic substance which may be bent under pressure or deformed to any extent without assuming a "set" and which will resume its original shape when relieved of the deforming pressure.

I have found that the mixture of rubber and fabric obtained by reclaiming old tires is admirably adapted for the manufacture of the fender, both on account of its low cost as well as its durability and elasticity. The fender may be formed in any suitable manner either by the use of laminated sheets or a homogenous mixture of the stock substance. It is preferably made in a mold under pressure and then vulcanized. The process of vulcanization transforms the otherwise limber article into a fender as thoroughly capable of sustaining its shape, in fenders of ordinary size, as is a metallic fender.

It is to be understood that any of the features of the fender hereinbefore described may be omitted if desired or modified in shape or position without departing from the scope of the invention, the essential feature of which is the construction of a fender solely of an elastic non-metallic substance, and, as will hereinafter appear, the resilient mounting of said fender relative to the automobile.

The fender is anchored to the auto vehicle at one or more places as may be desired by brackets which in general are denoted in the drawings by the reference character 7. These brackets each consists of a head portion 8 and a divided shank including parts 9 and 10 the former being secured to or integral with the head portion, while the part 10 is formed with screw apertures 11 or other means for rigidly attaching it to the automobile. The parts of the shank are connected by a flexible member, the same being here shown as a spring 12 embracing both shank parts and having a free resilient intermediate portion. The head 7 of the bracket preferably consists of a metallic yoke formed of flat stock shaped to embrace the bosses 6 the latter being transversely apertured as indicated at 13 in Figure 1 to receive a bolt 14 which passes through aligned apertures in the opposite sides of the yoke. The ends of the yoke are preferably angularly turned to form lugs lying against the flat crown portion of the fender, to which they may be suitably secured. Aside from the points at which the fender is resiliently anchored to the auto vehicle it is preferably left entirely free from the automobile so that its freedom of movement when stressed by the impact of collision will not be impaired. The fender thus floats, being enabled to yield completely to the resistance of the contacting object and to reassume its normal position when the pressure of the colliding object has been removed.

In use the fender preferably will be enameled or painted with an elastic coating which will yield without fracture when the fender bends, and return to its original state when the fender resumes its normal shape leaving no mark of collision. One of the advantages of a fender of this nature is that it is incapable of doing appreciable damage to another car with which it may collide.

The expanded portion 4 of the longitudinal rib, which underlies the crown of the fender at its free end, whether front or rear, not only stiffens the unsupported part of the fender but acts as a buffer to receive the blows from skid chains when struck from either direction, or the broken links thereof, lengthening the life of the fender under the abuse received from the skid chains, also avoiding the objectionable racket which the skid chains usually make when beating against a metallic fender.

One of the inherent properties of a rubber or rubber composition fender is its non-resonant character whereby the vibration sounds from the wheels and chassis are not augmented as by the usual fender nor are they communicated to the space within the body of the automobile. By mounting the fenders resiliently with respect to the body or chassis of the car the transmission of noise is still further reduced, this form of mounting being peculiarly advantageous when applied to automobiles having closed bodies, in which the rumble from metallic fenders, is extremely objectionable.

In fenders of the large size it is sometimes desirable to afford support additional to that furnished by the inherent stiffness of the vulcanized fender itself. This is provided in the present invention by a metallic strip 15 running longitudinally of the fender for a considerable extent of its length, said strip being supported by the bracket 7 in a manner shown in Figure 6. It is to be understood that in no instance is the metallic strip to be considered a part of the fender, the latter merely resting upon it, said strip when used, being a part of the bracket structure. It is apparent that while a true combination exists between a resilient, deformable fender and the resilient support therefor, yet in certain cases the fender may be otherwise supported, and on the other hand, the resilient supports may be used with other types of fenders.

While I have in the present application illustrated and described what I believe to be a preferred and practical embodiment of my invention yet it is to be understood that numerous departures may be made from the details of construction thereof as shown, to the extent permitted by the breadth of the appended claims.

Having described my invention what I claim as new and desire to secure by Letters Patent, is:—

1. A fender for automobiles comprising a flexible crown portion having a longitudinally extending rib formed on its under side, intersected at intervals by transverse ribs, and support-engaging bosses projecting from said longitudinal rib adjacent the points of intersection of said transverse ribs, said longitudinal rib being of expanded width adjacent an unsupported end of said fender.

2. A fender for automobiles comprising a crown portion having a longitudinally extending rib formed on its under side, intersected at intervals by transverse ribs, and support-engaging bosses projecting from said longitudinal rib adjacent the points of interestion of said transverse ribs, said longitudinal rib being of expanded width adjacent an unsupported end of said fender, said crown portion, ribs and bosses being integrally molded and vulcanized.

3. In combination, a fender including support-engaging bosses constructed solely of flexible non-metallic substance, bracket parts engaging said bosses, parts securable to an auto vehicle, and intermediate resilient portions connecting said parts.

4. In combination, a fender including support-engaging bosses constructed solely of flexible non-metallic substance, said bosses being transversely apertured, bracket parts engaging said bosses, parts securable to an auto vehicle, and resilient intermediate portions, and bolts passing through the first mentioned parts and through the apertures in said bosses.

In testimony whereof I have hereunto set my hand.

HENRY J. SCHEID.